United States Patent
Sane et al.

(10) Patent No.: US 9,620,022 B2
(45) Date of Patent: Apr. 11, 2017

(54) AIRCRAFT MOTION PLANNING METHOD

(71) Applicant: Sikorsky Aircraft Corporation, Stratford, CT (US)

(72) Inventors: Harshad S. Sane, Southbury, CT (US); Thomas A. Frewen, West Hartford, CT (US); Brendan J. Englot, New York, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/728,660

(22) Filed: Jun. 2, 2015

(65) Prior Publication Data

US 2015/0356875 A1 Dec. 10, 2015

Related U.S. Application Data

(60) Provisional application No. 62/010,235, filed on Jun. 10, 2014.

(51) Int. Cl.
*G08G 5/00* (2006.01)
*G01C 21/20* (2006.01)
*G05D 1/00* (2006.01)

(52) U.S. Cl.
CPC ........... *G08G 5/0047* (2013.01); *G01C 21/20* (2013.01); *G08G 5/0034* (2013.01); *G08G 5/0086* (2013.01); *G08G 5/0091* (2013.01)

(58) Field of Classification Search
CPC .. G08G 5/0047; G08G 5/0034; G08G 5/0086; G01C 21/20; G05D 1/0005
USPC ........................................................ 701/408
See application file for complete search history.

(56) References Cited

U.S. PATENT DOCUMENTS

| 6,059,226 A | 5/2000 | Cotton |
| 6,085,147 A * | 7/2000 | Myers ................ G01C 21/3453 |
| | | 342/33 |
| 6,092,007 A | 7/2000 | Cotton |
| 6,259,988 B1 | 7/2001 | Galkowski et al. |
| 6,266,610 B1 * | 7/2001 | Schultz .................. G05D 1/101 |
| | | 701/528 |

(Continued)

FOREIGN PATENT DOCUMENTS

| EP | 0854353 A2 | 7/1998 |
| EP | 1065470 A1 | 1/2001 |

(Continued)

OTHER PUBLICATIONS

Extended European Search Report issued in corresponding EP Application No. 15171312 on Oct. 26, 2015.

(Continued)

*Primary Examiner* — Yazan Soofi
(74) *Attorney, Agent, or Firm* — Cantor Colburn LLP

(57) ABSTRACT

A method of route planning for a vehicle proceeding from a current location to a destination in a planning space is provided. The method includes generating a destination-rooted tree from global information that provides cost-to-go routing to the destination from multiple locations in the planning space, generating a vehicle-rooted tree using local information from the current location out to a sensing horizon and determining a local destination at the sensing horizon. The local destination corresponds to minimal cost-to-go routing obtained from the destination-rooted tree.

14 Claims, 2 Drawing Sheets

(56) References Cited

U.S. PATENT DOCUMENTS

| | | | |
|---|---|---|---|
| 6,965,944 B1 | 11/2005 | Soga | |
| 7,272,492 B2 | 9/2007 | McCubbin et al. | |
| 7,447,593 B2 | 11/2008 | Estkowski et al. | |
| 8,010,242 B1* | 8/2011 | Ginsberg | G05D 1/0005 701/3 |
| 8,401,790 B2 | 3/2013 | Eisele | |
| 8,483,874 B2 | 7/2013 | Kim et al. | |
| 8,843,303 B1* | 9/2014 | Young | G08G 5/0039 701/122 |
| 9,020,664 B2* | 4/2015 | Burgin | B64D 45/00 701/120 |
| 2003/0093219 A1 | 5/2003 | Schultz et al. | |
| 2005/0256639 A1 | 11/2005 | Aleksic | |
| 2006/0167601 A1 | 7/2006 | Henning | |
| 2010/0036606 A1* | 2/2010 | Jones | G01C 21/3446 701/533 |
| 2010/0076674 A1 | 3/2010 | Berot | |
| 2010/0094485 A1 | 4/2010 | Verlut | |
| 2010/0274487 A1 | 10/2010 | Neff | |
| 2011/0035087 A1 | 2/2011 | Kim et al. | |
| 2014/0032106 A1* | 1/2014 | Ginsberg | G01C 21/00 701/528 |

FOREIGN PATENT DOCUMENTS

| | | |
|---|---|---|
| EP | 2031350 A1 | 3/2009 |
| GB | 2443472 A | 5/2008 |
| JP | 2012234268 A | 11/2012 |
| WO | 2012108568 A1 | 8/2012 |

OTHER PUBLICATIONS

Seok et al., "Integrated Path Planning for a Partially Unknown Outdoor Environment", System Integration (SII), 2011 IEEE/SICE International Symposium; Dec. 20, 2011, pp. 643-648.

* cited by examiner

AIRCRAFT MOTION PLANNING METHOD

CROSS REFERENCE TO RELATED APPLICATION

This application is a Non-Provisional of U.S. Application No. 62/010,235 filed Jun. 10, 2014, the disclosures of which are incorporated by reference herein in its entirety

BACKGROUND OF THE INVENTION

The subject matter disclosed herein relates to an aircraft motion planning method and, more particularly, to an aircraft motion planning method using a recursive rapidly exploring random tree (RRT) algorithm with a goal-rooted planning tree for cost-to-go computation.

Motion planning or path planning algorithms solve a problem of navigation an aircraft from point A to point B while dealing with motion constraints, mission constraints and any other time-based or vehicle-based constraints. When the planning problem is implemented on a real-time or online framework, the planner has to repeatedly solve the problem starting from A as the vehicle agent gathers relevant new information that may have been previously unknown regarding the operating space, constraints and vehicle dynamics. This "repeated" solution terminates when the vehicle eventually reaches point B (in a multipoint problem, this continues onto point C and beyond).

A problem often faced by recursive planners relates to a need to maintain an ability to react to local changes while keeping global objectives intact. As an example, a planner needs to be able to insure that an aircraft avoids obstacles while the distance to a destination is continually reduced to the extent possible.

A motion planning problem for autonomous vehicles may be solved by various means (model-predictive optimal control, sampling-based planning, potential-field based planners, grid based planners (A*/D*)). Each approach has a trick to bring in the notion for cost-to-go in the respective framework. Typically this tends to be a "straight line distance" to goal from the end of local planning horizon, or some other conservative approach. The reason for this conservative approach is that these techniques tend to be computationally expensive so providing a more realistic estimate of cost-to-go involves solving a global problem repeatedly, which is computationally prohibitive or may be impossible in a given time.

BRIEF DESCRIPTION OF THE INVENTION

According to one aspect of the invention, a method of route planning for a vehicle proceeding from a current location to a destination in a planning space is provided. The method includes generating a destination-rooted tree from global information that provides cost-to-go routing to the destination from multiple locations in the planning space, generating a vehicle-rooted tree using local information from the current location out to a sensing horizon and determining a local destination at the sensing horizon. The local destination corresponds to minimal cost-to-go routing obtained from the destination-rooted tree.

In accordance with additional or alternative embodiments, the vehicle includes an aircraft.

In accordance with additional or alternative embodiments, the aircraft includes a sensor system disposed on an airframe and configured to sense multiple characteristics relevant to operations of the vehicle out to the sensing horizon and to generate the local information from sensing results and a computer receptive of the local information from the sensor system and including a memory unit on which the global information is stored and a processing unit configured to execute the generating of the destination-rooted tree and the vehicle-rooted tree and to execute the determining of the local destination.

In accordance with additional or alternative embodiments, the global information is updateable.

In accordance with additional or alternative embodiments, vehicle-rooted tree generation requires more computing resources than destination-rooted tree generation.

In accordance with additional or alternative embodiments, the global information includes coarse information and the local information includes fine information.

In accordance with additional or alternative embodiments, the coarse information includes topographic and global weather information at various altitudes.

In accordance with additional or alternative embodiments, the fine information includes vehicle status, obstacle, threat and local weather information.

In accordance with additional or alternative embodiments, the determining is re-computed at one or both of a pre-defined interval and with the vehicle proximate to the local destination.

According to another aspect, a vehicle having route planning capability in proceeding from a current location to a destination in a planning space is provided. The vehicle includes a sensor system configured to sense multiple characteristics relevant to operations of the vehicle out to a sensing horizon and to generate local information from sensing results and a computer receptive of the local information from the sensor system and including a memory unit on which global information is stored and a processing unit configured to execute a method. The method includes generating a destination-rooted tree from the global information that provides cost-to-go routing to the destination from multiple locations in the planning space, generating a vehicle-rooted tree using the local information from the current location out to the sensing horizon and determining a local destination at the sensing horizon, the local destination corresponding to minimal cost-to-go routing obtained from the destination-rooted tree.

In accordance with additional or alternative embodiments, the vehicle includes an aircraft.

In accordance with additional or alternative embodiments, the global information is updateable.

In accordance with additional or alternative embodiments, vehicle-rooted tree generation requires more computing resources than destination-rooted tree generation.

In accordance with additional or alternative embodiments, the global information includes coarse topographic and global weather information at various altitudes and the local information includes fine vehicle status, obstacle, threat and local weather information.

In accordance with additional or alternative embodiments, the determining is re-computed at one or both of a pre-defined interval and with the vehicle proximate to the local destination.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

A route planning using rapidly exploring random trees (RRT) method will be described below and refers to a sampling-based planning algorithm that addresses route planning for a vehicle by combining sampling techniques with graphical motion-plan-tree generation and extension to build a roadmap for the vehicle. The method includes the growth or generation of a vehicle-rooted motion tree from results of sampling of a vehicle space and a connection of the vehicle-rooted motion tree to a rapidly computed or once-computed destination-rooted tree that provides cost-to-go routing to a destination point from any relevant location in a planning space.

In accordance with the "cost-to-go" routing, while a local problem (i.e., an obstacle is present in a flight path of an aircraft) may be solved, the cost-to-go routing to the destination is provided such that it is continually reduced as the planner computes each subsequent local solution. The cost in the cost-to-go routing may be provided by a distance, time or fuel metrics (or many other metrics such as threat visibility, energy usage, etc.). Since solving the local solutions can be made to be computationally small when the solution is extended only out to a "planning horizon" while the cost-to-go to the destination point is reduced, finer resolution in local problem solving can be achieved.

Figure 1:
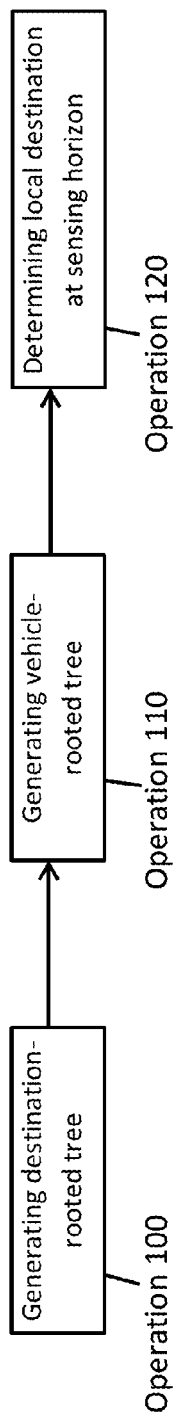
FIG. 1 is a flow diagram illustrating a method of route planning in accordance with embodiments.
Figure 2:
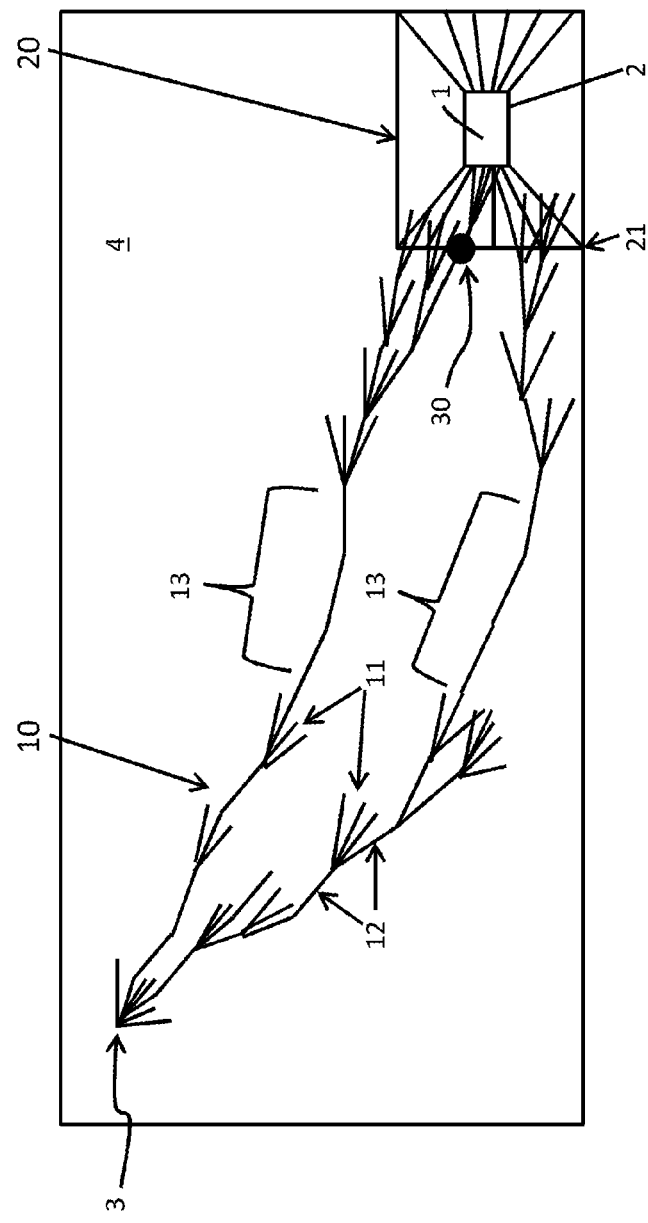
FIG. 2 is a schematic diagram illustrating a destination-rooted tree and a vehicle-rooted tree of the method of FIG. 1.

With reference to FIGS. 1 and 2, a method of route planning for a vehicle 1 proceeding from a current location 2 to a destination 3 in a planning space 4 is provided. The method includes generating a destination-rooted tree 10 from global information that provides cost-to-go routing to the destination 3 from multiple locations in the planning space 4 (operation 100), generating a vehicle-rooted tree 20 using local information from the current location 2 out to a sensing horizon 21 (operation 110) and determining a local destination 30 at the sensing horizon 21 (operation 120). In accordance with embodiments, the local destination 30 corresponds to minimal cost-to-go routing obtained from the destination-rooted tree 10.

Figure 3:
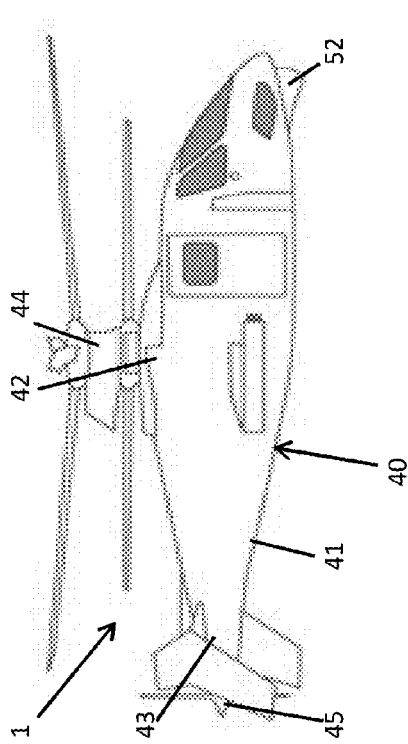
FIG. 3 is a schematic illustration of an aircraft in accordance with embodiments.
Figure 4:
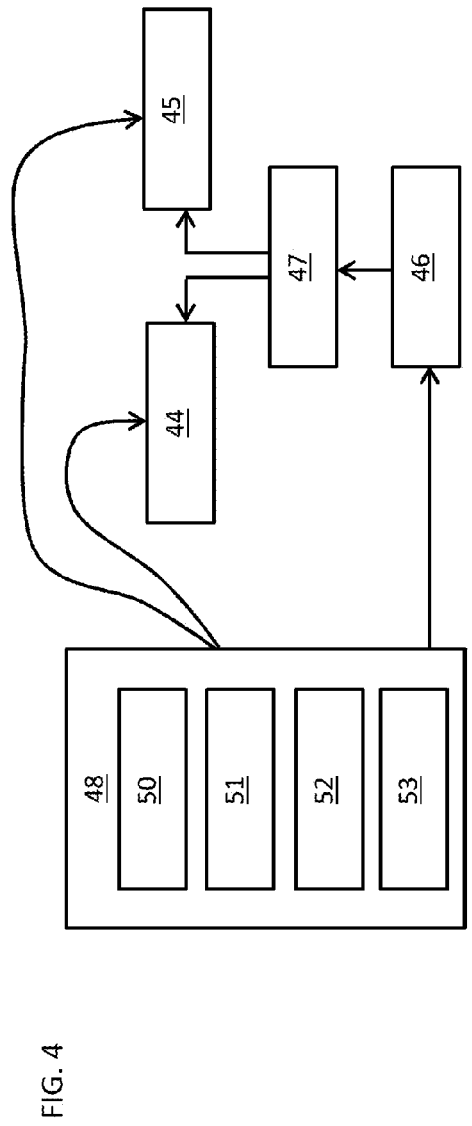
FIG. 4 is a schematic illustration of components of the aircraft of FIG. 3.

In accordance with embodiments, the vehicle 1 may be provided as an aircraft 40, such as a helicopter. With reference to FIGS. 3 and 4, the aircraft 40 includes an airframe 41. The airframe 41 may be formed to define a cabin that can accommodate a pilot and at least one or more crewmen or passengers and has an upper portion 42 and a tail portion 43. A main rotor apparatus 44 is operably disposed at the upper portion 42 and a tail rotor apparatus 45 is operably disposed at the tail portion 43. The main rotor apparatus 44 may be provided as a single rotor or at coaxial counter-rotating rotors. The tail rotor apparatus 45 may be provided as a tail rotor or a propeller. In either case, operations of the main rotor apparatus 44 and the tail rotor apparatus 45 relative to the airframe 41 drive flight operations of the aircraft 40.

As shown in FIG. 4, the airframe 41 is further formed to encompass an engine 46, a transmission 47 and a flight computer 48, which is operably coupled to the main rotor apparatus 44, the tail rotor apparatus 45, the engine 46 and the transmission 47. In accordance with commands issued by the flight computer 48, the engine 46 drives the operations of the main rotor apparatus 44 and the tail rotor apparatus 45 via the transmission 47 for flight control and navigation purposes. The flight computer 48 additionally issues collective and cyclic servo commands to the main rotor apparatus 44 and the tail rotor apparatus 45 to provide for additional flight controls and navigation.

The flight computer 48 includes a memory unit 50, a processor unit 51, a sensor system 52 and a transmission/reception module 53. The memory unit 50 may be any computer or machine readable storage unit and includes various types of read/write and read only memory devices. The above-noted global information for use in the generation of the destination-rooted tree of operation 100 may be stored in/on the memory unit 50 along with executable instructions for executing the methods described herein. In accordance with embodiments, the global information includes coarse information such as, for example, topographic information at various altitudes, global weather information at various altitudes, threat information, communication zones, no-fly-zones and other vehicle route information. As such, the global information may be all relevant information needed to seek or avoid certain planning areas. The global information may be updateable by way of the transmission/reception of newly available world-level data via the transmission/reception module 53.

The sensor system 52 may be provided as a LIDAR or other range sensing system and may be disposed at various points on the airframe 41. The sensor system 52 is configured to sense multiple characteristics relevant to operations of the aircraft 40 out to the sensing horizon 21 and is further configured to generate, from results of the sensing, the above-noted local information for use in the generation of the vehicle-rooted tree of operation 110. The local information includes fine information such as, for example, vehicle status information, obstacle presence information, threat information and local weather information.

Due to the global information being generally coarse-level information and the local information being generally fine-level information, a level of detail of the vehicle-rooted tree is greater than a level of detail of the destination-rooted tree. Thus, in accordance with embodiments, the generating of the vehicle-rooted tree of operation 110 may, in some but not all cases, require more computing resources than the generating of the destination-rooted tree of operation 100. As such, computing resources of the flight computer 48 may be reserved for the generating of the vehicle-rooted tree of operation 110 with the generating of the destination-root tree of operation 100 conducted rarely or when an update is available. In accordance with further instructions, the generating of the vehicle-rooted tree of operation 110 may be conducted at a predefined interval along with the determining of operation 120. However, in accordance with additional or alternative embodiments, the generating of the vehicle-rooted tree of operation 110 may be conducted along with the determining of operation 120 with the vehicle 1 located at or being proximate to the local destination 30.

The processor unit 51 is coupled to the memory unit 50, the sensor system 52 and the transmission/reception module 53. By way of these various couplings, the processor unit 51 is able to communicate with the memory unit 50 and the sensor system 52 and to control the transmission/reception module 53. In particular, by way of the coupling of the processor unit 51 with the sensor system 52, the processor unit 51 is receptive of the generated local information from the sensor system 52. By way of the coupling of the processor unit 51 with the memory unit 50, the processor unit 51 is caused, by the execution of the executable instructions, to use the global information to conduct the generating of the destination-rooted tree of operation 100, to use the local information to conduct the generating of the vehicle-rooted tree of operation 110 and to conduct the determining of operation 120.

Although illustrated in FIGS. 3 and 4 as a piloted helicopter type of aircraft, it is to be understood that this is merely exemplary and that the vehicle 1 can be any type of ground- or air-based vehicle and can be manned, unmanned or remotely piloted.

With reference back to FIGS. 1 and 2, it will be understood that the destination-rooted tree 10 extends outwardly from the destination 3 in the planning space 4 and includes various nodes 11 and edges 12. The edges 12 extend between adjacent nodes 11. Each node 11 is representative of a set of local routes to an end of an edge 12. Where the vehicle 1 is an aircraft 40, the destination-rooted tree 10 may be associated with a given altitude range that it defined by a current mission plan. This altitude range may be high relatively high, in which case the destination-rooted tree 10 will be populated will multiple available cost-to-go routing options, or relatively low. In the latter case, the current mission plan may dictate that the aircraft 40 fly a predefined safe distance above the ground but below a height at which the aircraft would be radar detectable. In these instances, the extent of the destination-rooted tree 10 may be substantially impacted by the topography of the ground. This is especially true where a current mission plan is conducted in hilly territory that might permit only a few pathways (see, e.g., the individual routes 13 in FIG. 2) across a given portion of the planning space 4. Such pathways (or routes 13) may be defined, for example, along valleys defined between hills in the terrain. Where the vehicle 1 is a ground-based vehicle, such as a car, the destination-rooted tree 10 may resemble a road map of the planning space 4 with the nodes 11 being representative of "friendly" neighborhoods the vehicle 1 is permitted to travel through.

It will be further understood that the vehicle-rooted tree 20 extends outwardly from the vehicle 1 to the sensing horizon 21. The sensing horizon 21 may be defined as a region representing the extent of the sensing capability of the sensor system 52 or as a sub-region within the extent of the sensing capability of the sensor system 52 in which local flight control and navigational decisions/solutions are made. That is, the sensing horizon 21 may be defined as a region in which, for example, an obstacle is detected to present and needs to be safely avoided. Thus, a size of the sensing horizon may be variable based on current conditions including the speed of the vehicle 1 and the ability of a pilot or operator to control the vehicle 1.

With continued reference to FIGS. 1 and 2, during a given iteration of the route planning method described above, the determining of the local destination 30 at the sensing horizon 21 of operation 120 is conducted by the processor unit 51. In doing so, the processor unit 51 is configured to seek to make local control and navigational decisions based on the local information out to the sensing horizon 21 while preserving and maintaining the overall goal of achieving minimal cost-to-go route planning toward the destination 3. Once these local control and navigational decisions are made, or once the vehicle 1 approaches the (original) sensing horizon 21 or the local destination 30 or at predefined intervals, the processor unit 51 may interrogate the sensor system 52 for new local information. Upon receipt of the new local information, the vehicle-rooted tree 20 can be re-generated with the vehicle 1 at a new location in the planning space 4 and with a new sensing horizon so that the route planning method can be re-completed. The destination-rooted tree 10 may not need to be re-generated, however, unless a change in a current mission plan or some other similar event occurs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of route planning for a vehicle proceeding from a current location to a destination in a planning space, the method comprising:
    generating, through a processor, a destination-rooted tree from global information that provides cost-to-go routing to the destination from multiple locations in the planning space, wherein the global information includes course information including topographic and global weather information at various altitudes;
    generating, through the processor, a vehicle-rooted tree using local information from the current location out to a sensing horizon generated by vehicle based sensors;
    determining, through the processor, a local destination at the sensing horizon, the local destination corresponding to minimal cost-to-go routing obtained from the destination-rooted tree; and
    continually reducing the cost-to-go routing of the destination-rooted tree based on the local destination.

2. The method according to claim 1, wherein the vehicle comprises an aircraft.

3. The method according to claim 2, wherein the aircraft comprises:
    a sensor system disposed on an airframe and configured to sense multiple characteristics relevant to operations of the vehicle out to the sensing horizon and to generate the local information from sensing results; and
    a computer receptive of the local information from the sensor system and comprising the processor and a memory unit on which the global information is stored and a processing unit configured to execute the generating of the destination-rooted tree and the vehicle-rooted tree and to execute the determining of the local destination.

4. The method according to claim 1, wherein the global information is updateable.

5. The method according to claim 1, wherein vehicle-rooted tree generation requires more computing resources than destination-rooted tree generation.

6. The method according to claim 1, wherein the local information comprises fine information.

7. The method according to claim 6, wherein the fine information comprises vehicle status, obstacle, threat and local weather information.

8. The method according to claim 1, wherein the determining is re-computed at one or both of a predefined interval and with the vehicle proximate to the local destination.

9. A vehicle having route planning capability in proceeding from a current location to a destination in a planning space, the vehicle comprising:
- a sensor system configured to sense multiple characteristics relevant to operations of the vehicle out to a sensing horizon and to generate local information from sensing results; and
- a computer receptive of the local information from the sensor system and comprising a memory unit on which global information is stored and a processing unit configured to execute a method comprising:
- generating a destination-rooted tree from the global information that provides cost-to-go routing to the destination from multiple locations in the planning space, wherein the global information includes course information including topographic and global weather information at various altitudes;
- generating a vehicle-rooted tree using the local information from the current location out to the sensing horizon;
- determining a local destination at the sensing horizon, the local destination corresponding to minimal cost-to-go routing obtained from the destination-rooted tree; and
- continually reducing the cost-to-go routing of the destination-rooted tree based on the local destination.

10. The vehicle according to claim 9, wherein the vehicle comprises an aircraft.

11. The vehicle according to claim 9, wherein the global information is updateable.

12. The vehicle according to claim 9, wherein vehicle-rooted tree generation requires more computing resources than destination-rooted tree generation.

13. The vehicle according to claim 9, wherein the local information comprises fine vehicle status, obstacle, threat and local weather information.

14. The vehicle according to claim 9, wherein the determining is re-computed at one or both of a predefined interval and with the vehicle proximate to the local destination.

* * * * *